(12) United States Patent
Peckolt

(10) Patent No.: US 9,140,230 B2
(45) Date of Patent: Sep. 22, 2015

(54) SYSTEM AND METHOD FOR EXTRACTING ENERGY FROM SEA WAVES

(75) Inventor: Jan Peter Peckolt, Duisburg (DE)

(73) Assignee: NEMOS GMBH, Duisburg (DE)

( * ) Notice: Subject to any disclaimer, the term of this patent is extended or adjusted under 35 U.S.C. 154(b) by 89 days.

(21) Appl. No.: 13/978,283

(22) PCT Filed: Jan. 17, 2012

(86) PCT No.: PCT/EP2012/050648
§ 371 (c)(1),
(2), (4) Date: Jul. 26, 2013

(87) PCT Pub. No.: WO2012/098120
PCT Pub. Date: Jul. 26, 2012

(65) Prior Publication Data
US 2013/0313832 A1    Nov. 28, 2013

(30) Foreign Application Priority Data

Jan. 18, 2011   (DE) .......................... 10 2011 008 877

(51) Int. Cl.
*F03B 13/16*     (2006.01)
*F03B 13/18*     (2006.01)

(52) U.S. Cl.
CPC ................ *F03B 13/16* (2013.01); *F03B 13/18* (2013.01); *F03B 13/1885* (2013.01); *Y02E 10/38* (2013.01)

(58) Field of Classification Search
CPC ....... F03B 13/18; F03B 13/16; F03B 13/1885
USPC ................................. 290/42, 53; 60/495–507
See application file for complete search history.

(56) References Cited

U.S. PATENT DOCUMENTS 3,918,260 A * 11/1975 Mahneke ......................... 60/500
3,924,827 A * 12/1975 Lois ........................... 244/153 R
(Continued)

FOREIGN PATENT DOCUMENTS

FR   2869368 A1   10/2005
GB   2015657 A    9/1979
(Continued)

OTHER PUBLICATIONS

English Translation of International Preliminary Report on Patentability from corresponding Patent Cooperation Treaty Patent Application No. PCT/EP2012/050648 issued Jan. 16, 2013.
(Continued)

*Primary Examiner* — Tulsidas C Patel
*Assistant Examiner* — Viet Nguyen
(74) *Attorney, Agent, or Firm* — Gardner, Linn, Burkhart & Flory, LLP

(57) ABSTRACT

A system and method for extracting energy from sea waves with the aid of a buoyancy body, from which cables . . . are guided in a splayed-out manner to mutually spaced, stationary reference points which are provided beneath the buoyancy body. At least one of the cables is provided as a guide cable for guiding the buoyancy body on a trajectory and at least one cable is provided as a working cable for transmitting the wave energy to at least one energy converter. In order to make a more efficient use of the wave energy possible, even with varying wave directions, and utilize synergy effects from the combination with offshore wind power plants, according to the invention the buoyancy body can be oriented freely in space in relation to the wave direction. Alternatively or in addition, the energy converter or converters and the devices for cable control and/or cable pull are arranged outside the buoyancy body in a stationary manner.

22 Claims, 2 Drawing Sheets

(56) References Cited

U.S. PATENT DOCUMENTS

| | | | |
|---|---|---|---|
| 4,208,877 A * | 6/1980 | Evans et al. | 60/495 |
| 4,408,454 A * | 10/1983 | Hagen et al. | 60/500 |
| 5,066,867 A * | 11/1991 | Shim | 290/53 |
| 5,701,740 A * | 12/1997 | Tveter | 60/505 |
| 5,808,368 A | 9/1998 | Brown | |
| 7,891,183 B2 * | 2/2011 | Al-Huwaider | 60/498 |
| 8,667,791 B2 * | 3/2014 | McEvoy et al. | 60/497 |
| 2003/0193197 A1 * | 10/2003 | Hibbs et al. | 290/53 |
| 2008/0093852 A1 * | 4/2008 | Vowles et al. | 290/42 |
| 2009/0102200 A1 * | 4/2009 | Greenspan et al. | 290/53 |
| 2010/0043425 A1 * | 2/2010 | Dragic | 60/504 |
| 2010/0064679 A1 * | 3/2010 | Straume | 60/507 |
| 2010/0102563 A1 * | 4/2010 | Akervoll | 290/53 |
| 2010/0107627 A1 * | 5/2010 | Morgan | 60/495 |
| 2011/0037266 A1 * | 2/2011 | Wille et al. | 290/53 |
| 2011/0241346 A1 * | 10/2011 | Mayoral Gonzalez | 290/53 |

FOREIGN PATENT DOCUMENTS

| | | | |
|---|---|---|---|
| WO | WO 2009108052 A2 * | 9/2009 | F03D 1/00 |
| WO | WO 2010061013 A1 * | 6/2010 | |
| WO | WO 2010132930 A1 * | 11/2010 | F03B 13/18 |

OTHER PUBLICATIONS

International Search Report and Written Opinion of the International Searching Authority from corresponding Patent Cooperation Treaty (PCT) Application No. PCT/EP2012/050648, mailed Jul. 24, 2012.

* cited by examiner

SYSTEM AND METHOD FOR EXTRACTING ENERGY FROM SEA WAVES

CROSS REFERENCE TO RELATED APPLICATION

The present application claims the priority benefits of International Patent Application No. PCT/EP2012/050648, filed on Jan. 17, 2012, which is hereby incorporated herein by reference in its entirety.

BACKGROUND OF THE INVENTION

The invention relates to a system and method for extracting energy from sea waves with the aid of a buoyancy body, activated by the movement of the sea waves and at least partially immersed in the sea water, and of which the longitudinal extension amounts to a multiple of its height and width and from which cables are run in a splayed-out manner to mutually spaced stationary reference points which are provided beneath the buoyancy body, wherein at least one of the cables is provided as a guide cable for guiding the buoyancy body on a trajectory and at least one cable is provided as a working cable for transmitting the wave energy to at least one energy converter.

In the context of the present invention, an energy converter is understood to mean systems or equipment which are provided to convert the mechanical energy of the buoyancy body into electrical or hydraulic energy using mechanical means.

In order to achieve environmental protection goals, in order to be independent of fossil fuels and to withdraw from nuclear energy, the development of renewable energy sources is being advanced all over the world. A large amount of energy is available in the oceans and seas in the form of sea waves, the potential of which is currently hardly being exploited economically for power generation.

In recent decades, research has been carried out in this area all over the world and many strategies for using sea wave energy have been developed. Thus, a wide range of systems came into being, but only a few of these ever got beyond the prototype stage.

The majority of those projects which led to prototypes ultimately failed during testing owing to the violence of extreme sea motion conditions. In addition, the corrosive conditions of the surroundings presented major problems in relation to the durability of the installations and their functional reliability. Other models remained well behind their predicted system performance in natural sea motion conditions. Only a few of the projects achieved the status of commercial operation, feeding into existing energy supply networks.

The present invention relates to systems in which a relative movement of bodies which are moved vertically, horizontally or in both directions in combination is converted into electrical or hydraulic energy. These so-called systems with moved bodies have received the most attention in the relevant literature since they make it possible to achieve very high degrees of effectiveness, at least from a theoretical point of view.

An evaluation criterion of the systems for wave conversion is the technical degree of effectiveness, i.e., the quotient of installation power and of the available power out of the wave. For a given location and a given installation size it definitively determines the level of the energy yield. Apart from the technical degree of effectiveness, the costs of the system are the major decisive factor for economic operation. These costs are composed of the costs for erecting, maintaining and removing the installation and the costs of the necessary infrastructure. A simple robust construction of a technically efficient installation with a reasonable level of effectiveness which requires high levels of investment and maintenance costs may be considered superior from an overall economic point of view. During the development of new systems for energy conversion from sea waves both criteria must therefore be considered in order to be able to achieve low power production costs.

From the specialist literature (Dr. Ing. Kai-Uwe Graw, "Wellenenergie—eine hydromechanische Analyse", ISSN 0179-9444, IGAW BUGH Wuppertal, section 8, page 8-8) discloses the operational principle of a floating body which is caused to move with respect to a fixed reference point by waves and in so doing drives an electric generator. For this purpose, the buoyancy body is anchored via a cable system to two spaced-apart fixed points on the sea bed, both in the wave direction and also opposite to the wave direction, in such a way that the cables are splayed at about 45°. One of the anchoring cables is connected as a working cable to two hydraulic cylinders disposed on the buoyancy body, the other is fixed as a guide cable for the buoyancy body both on the buoyancy body and also on the sea bed. Both during upwards and downwards and also during forwards and backwards movements of the buoyancy body as a result of wave motion, the first anchoring cable (working cable) undergoes a relative movement with respect to the body, wherein two hydraulic cylinders are actuated. The hydraulic pressure thus generated is used in an energy converter disposed on the buoyancy body for generator-based power generation.

During this time, the other anchoring cable (guide cable) guides the buoyancy body, in an orientation with respect to the wave which is fixed by the guying directions of the cables, on a trajectory (circular arc segment) about the fixed attachment point.

The French patent application FR 2 869 368 A1 describes a system for energy recovery from sea waves, in which, as in the system described by "Graw", wave motion both in the horizontal and in the vertical direction can be exploited. For this purpose, a buoyancy body in the form of a disc-like platform is connected with cables which are anchored at one end to three mutually spaced attachment points on the sea bed. From that location, the cables are guided via deflection rollers disposed on the platform to a common ballast body which is disposed centrally below the platform and is attached to the ends of the cables. By reason of its own weight the ballast body always keeps the cables under tension. As the platform moves up and down and to and fro under the influence of the waves, the deflection rollers are driven in alternating directions of rotation by the cables guided thereover and convert the energy by driving an attached generator or a high-pressure pump, which for its part drives a turbine generator unit.

Both systems have disadvantages. The system described by "Graw" has the disadvantage that an efficient trajectory on which the buoyancy body can move can be achieved only when the wave direction corresponds to the orientation of the system. The system cannot adapt to changes in the wave direction, which means that allowances need to be made for loss of performance.

A further disadvantage is seen in that the energy-converting devices and their necessary controls are disposed directly on the buoyancy body where they are directly exposed to the corrosive atmosphere of the sea air and to the sea water. Disruption to operation and failures are therefore to be expected with this described system, in each case a high level of maintenance effort is to be carried out. In addition, the mass of the devices used for energy conversion and control leads to an increase in the overall mass of the moved system, whereby the movement properties are negatively influenced.

The disadvantages described above are partially also to be expected from the system of FR 2 869 368 A1; the energy-converting devices are also disposed directly on the buoyancy body, the platform, in that case. Although the orientation of the buoyancy body with respect to the wave direction is not of significance in this system since the buoyancy body permits the same manner of operation in all directions owing to its disc-like shape, the advantage of the elongate buoyancy body which, when oriented transverse to the direction of wave advancement, is captured by an energy flow of greater width, is thereby sacrificed. A specific trajectory cannot be described with the known system during movement of the buoyancy body since the system does not undergo targeted guidance.

Finally, U.S. Pat. No. 5,066,867 A discloses a system in which the energy-converting devices are disposed in a stationary manner below the sea level which means that disadvantages caused by corrosion and difficult maintenance work are also to be expected in that case. It is also not possible to describe a trajectory during movement of the buoyancy body with this arrangement since the system does not undergo targeted guidance.

Comparable systems are also known from GB 2 015 657 A and from U.S. Pat. No. 5,808,368 A.

SUMMARY OF THE INVENTION

The present invention creates a system for extracting energy from sea waves, which permits efficient use of the wave energy with high energy yields even in the case of wave directions which vary at the location and that comprises high availability with low maintenance from low investment costs and simple technology. In addition, the system should be suitable to exploit synergy effects by combination with offshore wind power installations.

According to an aspect of the invention, all cables are attached to a common central attachment device on the buoyancy body, which allows free adjustment of the buoyancy body at least in relation to the wave direction. This can be effected in particular, if the buoyancy body can be freely oriented in space in relation to the wave direction, in that, for example, in order to attach all cables to the buoyancy body a rotary spindle is used in the region of the central vertical axis. This can be constituted by a rotary disc mounted so as to be rotatable about the vertical axis of the buoyancy body and to which the cables are attached. Alternatively, in order to achieve the said adjustability of the buoyancy body, a rail system can be used which permits movement of the engagement points of the cables relative to the buoyancy body. This consists of an endlessly curved rail on which carriages circulate on an approximately horizontal plane and to which the cables are attached. In both cases, the buoyancy body is rotatable or adjustable with respect to the attachment. After the buoyancy body has been oriented in parallel with the wave crest, a translational movement of the buoyancy body takes place along a circular arc segment path around the stationary attachment point remote from the waves or the stationary attachment points remote from the waves.

Whereas, in the prior art, the cables hold the buoyancy body in a preferred position which is preset by the stationary attachment points on the sea bed and which preferably corresponds to the most expected wave direction, the buoyancy body of an embodiment is moveably mounted in such a way that, even where the wave direction is changing, it can pivot into a position in which an optimal energy yield is to be expected. Since the buoyancy body in accordance with this embodiment is formed in an elongate manner, wherein its longitudinal extension amounts to a multiple of its height and width, with a wave crest incoming, the end of the buoyancy body closest to the wave crest is captured first, whereby the body is rotated into a position in parallel with the wave peak and is therefore oriented optimally with respect to the wave. This effect is similar to the "broaching" of a ship known in shipping. The buoyancy body can additionally be provided with leading profiles to influence the movement behaviour in a targeted and improved manner.

In an embodiment of the invention, provision is made to fasten the cables issuing from the buoyancy body to the buoyancy body in a passive manner, from where each cable is run, possibly over deflection means provided in the region of the stationary reference points, to the energy converter and to devices used for controlling the cable pull and/or cable length. "Passive" means in this context that the cables are connected to the buoyancy body via an attachment device and that no relative movements used for power generation take place between the cables and the buoyancy body. The term "control" is used here in a non-restricted manner but is also intended to include regulation, for example, controls using feedback loops.

Whereas, in areas of shallow water in which the prevailing wave direction is constant, the described installation with only two cables can be produced, in accordance with an embodiment of the invention at least three cables are attached to the buoyancy body and each of the cables is run to the energy converter and to the cable-control device via the deflection means allocated to it, which is attached to each of the at least three stationary reference points.

According to a feature of the invention, provision may be made that each of the cables can be used if required as a guide cable for the buoyancy body and as a working cable for transferring the mechanical energy to an energy converter. In particular, in the case of a buoyancy body which can be freely oriented, the described arrangement means that it is possible to orient the movement path of the system corresponding to the direction of wave advancement. The system therefore always works effectively with different wave directions which means that, even at locations of varying wave directions, high energy yields can be achieved.

An aspect of the invention also makes provision that in order to change the movement path of the buoyancy body the guide cables remote from the waves can be fixed at an adjustable length and/or can be controlled during the movement. In this way, a course for the buoyancy body adapted for the respective wave conditions can be adjusted and possibly also corrected during the wave motion in terms of effective usage. The length of the cables on the side remote from the waves determines the radius and inclination of the trajectory on which the buoyancy body attached to the cable end necessarily moves, while the control and energy transfer take place via the respective cable or cables closest to the waves.

In accordance with another aspect of the invention, the working cables closest to the waves can be controlled during movement of the buoyancy body. Upon encountering a wave crest they are stopped until a desired immersion depth or desired pulling force on the cable is achieved. In the following time interval a movement of the buoyancy body is permitted at a defined force or speed, wherein the buoyancy body transmits mechanical energy to the energy converter via the cables and their deflections.

The movement characteristics of the system (such as, for example, the radius of the circular arc, the inclination, amplitude, immersion depth, speeds and movement direction of the buoyancy body) can be adjusted by adjusting the respective cable lengths and the forces acting on the body via the control system/regulating system. It is, therefore, generally possible that, by means of the cooperation of the movement of all three cables, hydromechanically efficient movements in three-dimensional space can be carried out. By means of all three cables, it is possible either for energy to be withdrawn, energy to be introduced or for no energy conversion to take place. In this way, in order to achieve an optimal yield, the parameters can be adapted at any time to the current wave conditions (such as, for example, wave height, wave length, period and wave direction).

In accordance with one particular feature, the control of the individual working cables can be adapted to the respective direction of advancement of the incoming wave crest in order to achieve better use of the directional spectrum of the waves. This can be effected, for example, in the case of arrangements with two working cables, in that a larger movement amplitude is permitted for the cable from the direction of which an individual wave is incoming.

After reaching, the wave crest the body moves automatically back into its starting position. It has proved to be the case that the buoyancy body returns to its starting position more quickly owing to an active return arrangement. In experiments, it was possible to use these features to achieve considerable increases in yield in the region of high frequency short waves. In addition, by means of the controlled pulling and return force, increased immersion of the body in the wave trough is made possible. This leads to further increases in yield as proved in analytical observations. It is therefore proposed in accordance with the invention that in order to achieve active return of the buoyancy body lifted onto a wave crest or to control its immersion depth, a controllable pulling force can be applied to each of the working cables closest to the waves.

Provision may be made that the energy convertor is an electric generator and the working cable closest to the waves or the working cables closest to the waves are arranged to drive the generator directly or indirectly. The generator can be driven in a manner which is known per se via a cable disc, by means of which the cable provided for energy transfer is guided. Changes to the direction of rotation can thus be compensated for by free wheeling. Alternatively, linear generators or other known energy converters can be used, which are operated, for example, by compressed air cylinders or hydraulic cylinders, directly or indirectly via the cable or the cables.

To provide protection against the violence of extreme weather conditions it is possible according to another proposal for the buoyancy body to be lowered into water depths where there is little water movement. For this purpose, a part of the buoyancy body can be temporarily flooded with sea water. It is preferably flooded only to such a degree that it exerts an upwardly directed force on the working and guide cables. Therefore, after extreme weather conditions have abated, it can be guided to the surface by slackening of the cables. The body is pumped out by a pump. This can be operated by a solar cell installed on the surface of the body or by a battery. Alternatively, emptying can be effected with the aid of a permanent buoyancy means in the lower region of the buoyancy body.

In order to achieve improved adaptability to the wave conditions and to reduce the risk of damaging surrounding structures or vessels in the event the body breaks loose from its anchorages, it is furthermore proposed that the buoyancy body's own weight be low with high buoyancy forces, wherein the buoyancy forces can be modified by controlled flooding of the buoyancy body. A construction based on synthetic material is advantageous. It is feasible to form the buoyancy body as a pressure body, the shape of which is supported by an internal pressure which exceeds atmospheric pressure. Therefore, flexible materials can also be used. In forming the buoyancy body as a pressure body with a flexible outer skin, the necessary forces can be reduced when lowering the body into the depths of the water where there is less water movement, in that the air volume contained is temporarily reduced.

The energy converter and cable-control devices can be protected against sea water. This is achieved, for example, if they are disposed on a static structure above the sea level. Such a location can be, for example, a mast or tower anchored to the sea bed and projecting sufficiently above the highest expected wave peak. Such an arrangement provides better protection for the sensitive components of the system, whereby the functional safety of the system is clearly increased and maintenance work is reduced.

A provision may be made for connecting the system into offshore wind power installations, wherein the energy conversion devices protected against sea water, and devices for cable pull control are in each case disposed on or in the tower of the wind power installation or are integrated into the nacelle, or housing, of the wind power installation. The physical structure of the wind power installation is thus loaded only by compression forces and not by tilting moments, which means that integration of the system into already existing installations or into new builds is possible without significant change to the construction or statics.

A large number of the systems can be connected to form modules of an energy farm, which can be erected alone or in combination with a wind farm. The systems can be disposed in such a way that their anchorages are used at the same time at least partially by a plurality of systems. When a plurality of systems are connected to a wind farm, the systems can be disposed in such a way that they border the wind farm and therefore reduce the energy of the sea motion in the region of the wind power installations.

In areas of deep water, the stationary reference points for the buoyancy body can also be provided on an immersed construction which can be fixed in a stationary position by suitable anchorages or by means of suitable shaping binds a large hydrodynamic mass and therefore has a high level of inertia. In this way, orientation with respect to the wave direction can be effected by automatic orientation of the whole system about its anchorage. In this case, a kinematic arrangement with two cables suffices for each buoyancy body, of which only the cable closest to the waves is used for control and energy conversion.

In order to apply the system effectively to energy extraction from sea waves in the case of a working method, it is proposed that the guide cables on the side remote from the waves be adjusted in length initially in dependence upon the desired radius and the inclination of the trajectory of the buoyancy body. The working cables are then stopped on the side of the buoyancy body closest to the waves when a wave crest is contacted until the desired immersion depth or desired pulling force is achieved. A movement of the buoyancy body at a defined force or speed is then permitted, whereby the buoyancy body transfers mechanical energy to the energy converter via the working cable. After the wave crest is reached, the buoyancy body moves back into its starting position. During this time, the working cables are drawn in under tension by the control system. A new cycle can begin.

In order to achieve a further increase in yield of the method in accordance with the invention it is proposed actively to support the movements of the buoyancy body into its starting position by a force introduced via the working cable. By means of the active return, the body returns to its starting position more quickly, whereby considerable increases in yield in the region of high-frequency short waves can be achieved. At the same time, by means of the return forces introduced via the working cable or working cables, a deeper immersion of the body into the wave trough is made possible, whereby further increases in yield can be achieved.

The movement characteristics of the system (such as, for example, the radius of the circular arc, the inclination, amplitude, immersion depth, speeds and movement direction) can be adjusted by the control system, in that, in order to achieve an optimal movement path, the length of the guide cable or guide cables can be adapted in accordance with the invention prior to or during the movement of the buoyancy body.

The force introduced via the working cable can also be used to adjust the immersion depth of the buoyancy body into the wave trough.

The described system has the following advantages over known proposals:

The described arrangement makes possible an orientation of the buoyancy body and of the trajectory corresponding to the current direction of wave advancement, whereby high energy yields can be achieved even at locations of varying wave directions. The system as a whole is characterized by relatively high energy yields and low costs. The comparatively large energy yield is achieved by a high level of effectiveness of the optimized trajectory and by a large working width by reason of the elongate shape oriented transverse to the wave running direction. Low construction and maintenance costs result from the use of the cable kinematic arrangement which requires low material usage and a small number of moving parts and from the favourable positioning of all sensitive components used for control and energy conversion at a location protected from sea water outside the buoyancy body.

With the proposed coupling to offshore wind power installations, the system has decisive advantages compared with previous designs. The physical structure of the wind power installation is suitable in particular for arrangement of the energy converters and devices for controlling the cable pull and/or cable length. The structure is loaded only by compressive forces and not by titling moments. Therefore, retrofitting of the system on existing installations or integration into new builds is possible without considerable changes to the construction.

The system in accordance with the invention will be described hereinunder with the aid of an exemplified embodiment in which the buoyancy body which can be freely oriented is combined with the energy converter and cable control arrangement outside the sea water.

These and other objects, advantages and features of this invention will become apparent upon review of the following specification in conjunction with the drawings.

DESCRIPTION OF THE PREFERRED EMBODIMENT

Figure 1:
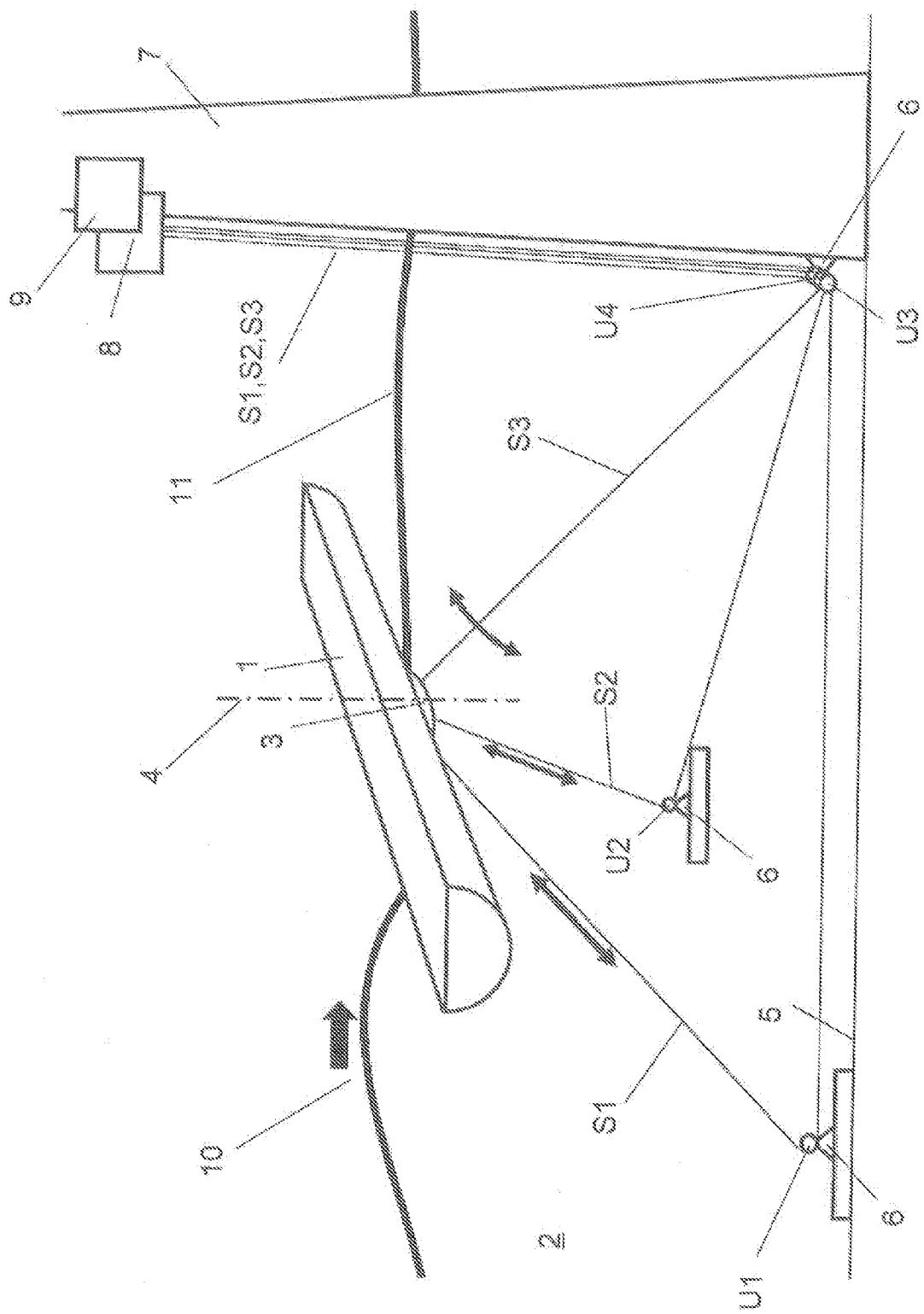
FIG. 1 shows the system in accordance with an embodiment of the invention in conjunction with an offshore wind power installation.

FIG. 1 shows the system in a greatly simplified manner. The semi-cylindrical buoyancy body floating in the sea water 2 is designated by 1, its lower curved side is partially immersed in the sea water 2. The closed buoyancy body 1 is hollow and consists of a corrosion-proof metal or synthetic material or similar sea water-resistant material. It can be seen that the buoyancy body 1 has a clearly greater length than its width or height and is flattened on the top. This shape has proved to be particularly good although other shapes are feasible.

An attachment device 3 for different cables S is disposed on the underside of the buoyancy body. The cables S are fastened passively, i.e., they are attached at that location but at the same time permit spatial movement of the buoyancy body 1 about the attachment 3 of the cables. In the simplest case, the attachment device 3 is mounted on the underside of the buoyancy body 1 so as to be able to rotate about the vertical axis 4 of the buoyancy body 1, which means that the buoyancy body 1 can be freely adjusted.

As shown by FIG. 1, three cables S1, S2 and S3 are fastened to the attachment device 3, being splayed in a pyramid shape in each case with respect to deflection rollers U1, U2 and U3 below sea level. The deflection rollers U1 to U3 are anchored in the region of the sea bed 5, for which purpose, for example, weighted foundations or staked anchors can be used, and form stationary reference points 6 for the buoyancy body 1 and its attachment device 3. In the example described herein, one of the deflection rollers U3 is attached in a deflection roller block 4 with further deflection rollers at the foot of a tower 7 of a wind power installation. Starting from the attachment device 3, each of the illustrated cables S1 to S3 is deflected over one of these deflection rollers U1 to U3 in a roll-off motion and run to the deflection roller block 4, from where all cables S1 to S3 are run upwards along the tower 7 of the wind power installation to an energy converter 8, which is disposed above the surface of the sea and outside the reach of the waves, and to a device for controlling the cable pull and/or cable length 9. Each of the cables S1, S2, S3 runs independently of the other cables around the deflection rollers U1, U2 and U3, and around the deflection rollers of the deflection roller block 4 and can be controlled separately and fixed at a predetermined length.

The energy converter 8, not described in detail here, consists essentially of the mechanically driven electric generator to which the mechanical energy from the movement of the buoyancy body is fed via the cables S1, S2, S3 and is converted, in suitable apparatus, into a rotational movement to drive the generator. The power generated in the generator is fed into the power network via a cable, not shown. It is also possible, in the meantime, to use the electric generator as a motor.

The system operates as follows:

A wave 11 oncoming in direction 10 reaches the broad side of the buoyancy body 1 initially on the side closest to it and effects a rotation of the buoyancy body 1—held at the stationary reference points 6—about the vertical axis 4 thereof, which is at the same time the axis of rotation of the attachment device 3 of the cables S1 to S3. As a result, the buoyancy body 1 is oriented transverse to the direction 10 of the oncoming wave 11 and presents an optimal attack surface for the wave 11. Of the cables S run tightly over the deflection rollers U, the cable S3 on the side remote from the waves serves to guide the buoyancy body 1, its length can also be adapted during the movement of the buoyancy body 1 in order to achieve an optimal movement path. This cable S3 is hereinunder referred to as a guide cable. Since the cable becomes the guide cable only by reason of its function, each of the cables S1 to S3 can become the guide cable as soon as it is located on the side of the buoyancy body 1 remote from the waves.

Cables S1 and S2 on the side of the buoyancy body 1 closest to the waves are stopped upon contact with a wave crest initially by means of the device for control of the cable pull and/or cable length 9 until the desired immersion depth of the buoyancy body 1 or the desired pulling force is achieved by the wave acting on the buoyancy body 1. Immediately thereafter, a movement of the buoyancy body 1 at a defined force or speed is permitted, whereby the mechanical energy is transferred to the generator via the cables S2 and S3 closest to the waves, hereinafter referred to as working cables.

During the movement of the buoyancy body 1, the working cables S2 and S3, as symbolized by the double arrows, are drawn out by the effect of the wave 11 and, after passing the crest of the wave, are drawn in with the aid of a force applied by the control. During this time, the guide cable S1 on the side of the buoyancy body 1 remote from the wave 11 defines its movement path.

After reaching the wave crest, the buoyancy body 1 moves automatically back into its starting position or is actively returned by a force introduced via the working cables S2 and S3. By means of an active return, the buoyancy body 1 returns to its starting position more quickly. The return force also effects an increased immersion of the buoyancy body 1 into the wave trough, which leads to further increases in performance.

By adjustment of the respective cable lengths and of the forces, which act on the buoyancy body 1, by means of the devices for controlling the cable pull and/or cable length 9, the movement characteristics of the system as a whole (such as, for example, the radius of the circular arc, the inclination, amplitude, immersion depth, speeds and movement direction) can be adjusted, which means that all parameters can be adapted to the current wave conditions, such as, for example, wave height, wave length, period and wave direction.

For improved use of the directional spectrum, the movement path can be adapted by individual control of each cable S1, S2, S3 to the respective direction of advancement of the incoming wave crests. This takes place, for example, in the case of arrangements with two working cables S2 and S3 in that for the working cable S2 or S3, from the direction of which an individual wave 11 arrives, a greater movement amplitude is allowed. The number of working and guide cables used is not limited to the number selected in the example but can be selected according to requirements and conditions. Each of the cables S can be used as a working or guide cable in dependence upon the wave oncoming direction.

Figure 2:
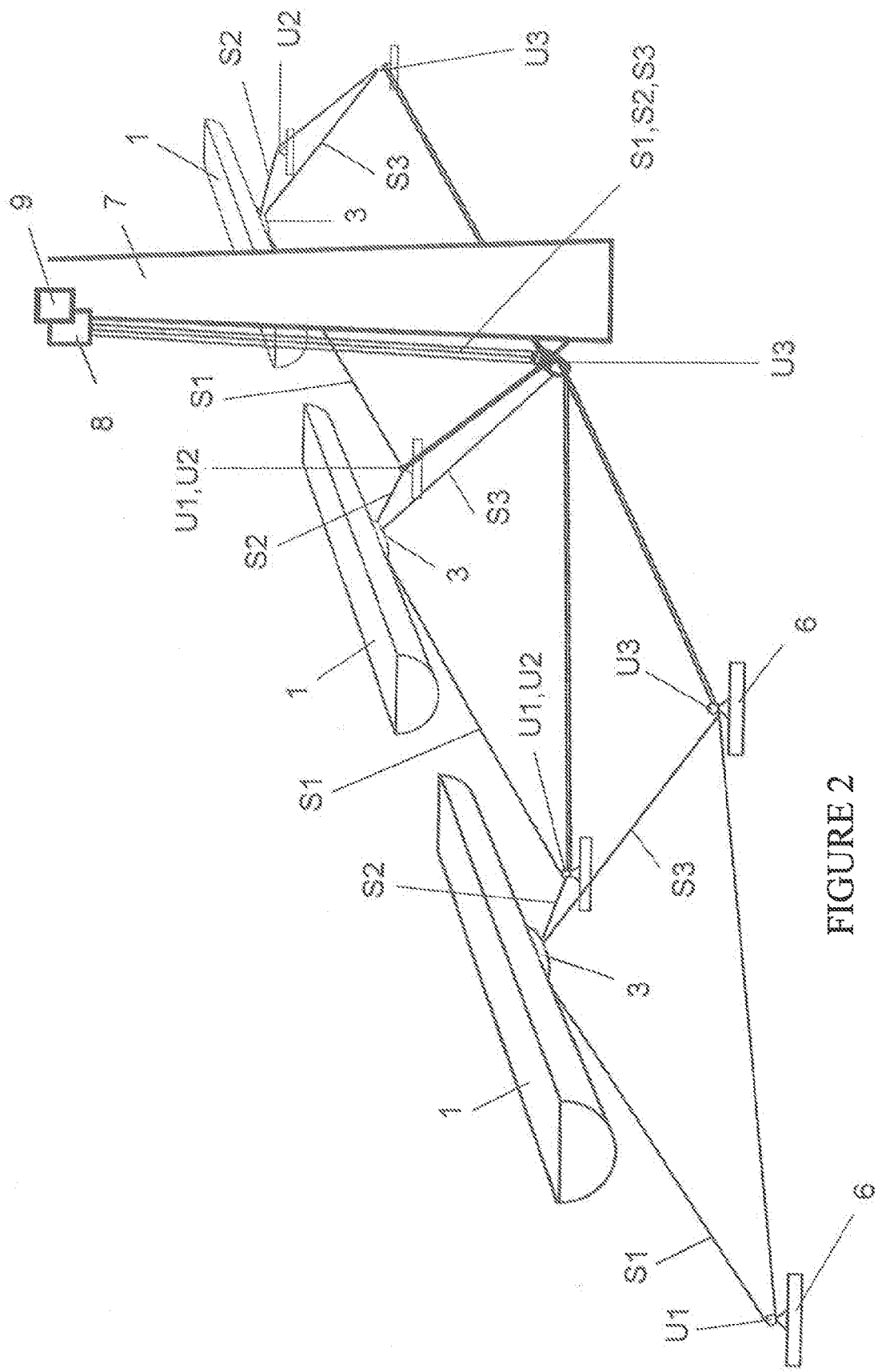
FIG. 2 shows the coupling of a wave energy farm consisting of a plurality of systems to an offshore wind power installation.

FIG. 2 schematically shows an application of the system in an energy farm in which the wind power installations have been combined with the system for energy extraction from sea waves. A plurality of the buoyancy bodies 1 depicted by FIG. 1 have been kinematically combined and operatively connected via the cable system depicted in FIG. 1 to the tower 7 (a plurality of towers can also be provided) of the wind power installation. The same parts have been designated by the same reference numerals as in FIG. 1.

In both examples, it is also feasible to run the cables inside the tower 7 of the wind power installation, similarly energy converters 8 and/or the devices for controlling the cable pull and/or the cable length 9 can be housed in a protected manner inside the tower. Since the physical structure of the wind power plant is loaded only by compressive forces and not tilting moments, retrofitting of the system on existing installations, or integration into new builds, is possible without considerable change to the construction.

The invention claimed is:

1. System for extracting energy from sea waves by the movement of the sea waves, said system comprising:
    a buoyancy body that is at least partially immersed in the sea water, wherein a longitudinal extension of said body is a multiple of a height and width of said body;
    at least three cables are run from the buoyancy body in a splayed-out manner to mutually spaced stationary reference points that are provided beneath the buoyancy body, wherein at least one of the cables is provided as a guide cable adjustable at a fixed length for guiding the buoyancy body on a trajectory and at least one of the cables is provided as a working cable for transmitting the wave energy extracted by the buoyancy body to at least one energy converter;
    wherein all said cables are attached to a common central attachment device on the buoyancy body, wherein the attachment device allows for adjustment of the buoyancy body at least in relation to wave direction by movement of the buoyancy body relative to the attachment device; and
    wherein the buoyancy body is configured for rotating about a central axis that coincides with the common central attachment device such that the buoyancy body orients parallel to the wave crests.

2. System for extracting energy from sea waves as claimed in claim 1, wherein the cables are passively attached by at least one attachment device to the buoyancy body, wherein the cables are routed over a stationary deflection roller provided in the region of the stationary reference points, to an energy converter and to a control device for controlling at least one chosen from cable pull and cable length.

3. System for extracting energy from sea waves as claimed in claim 2, wherein said cables are attached to the buoyancy body and the cables are run to the energy converter and to the control device via the respective stationary deflection roller allocated to it, at each of the at least three stationary reference points.

4. System for extracting energy from sea waves as claimed in claim 1 wherein the cables are adapted to be used as a guide cable for the buoyancy body and as a working cable for transferring the wave energy to the energy converter.

5. System for extracting energy from sea waves as claimed in claim 1 wherein at least one of the guide cables remote from the waves is at least one chosen from i) fixed at an adjustable length and ii) controlled during movement in order to change movement path of the buoyancy body.

6. System for extracting energy from sea waves as claimed in claim 5 wherein control of the individual cables is adaptable to the respective advancement direction of incoming wave crest.

7. System for extracting energy from sea waves as claimed in claim 1 wherein the cable length of each of the working cables closest to the waves can be controlled during the movement of the buoyancy body.

8. System for extracting energy from sea waves as claimed in claim 1 wherein a controllable pulling force is applicable to each of the working cables closest to the waves in order to achieve active return of the buoyancy body lifted onto a wave crest.

9. System for extracting energy from sea waves as claimed in claim 1 wherein the energy converter is an electric generator and each of the cables closest to the waves is arranged for direct or indirect driving of the generator.

10. System for extracting energy from sea waves as claimed in claim 1 wherein the buoyancy body is adapted to be lowered into water depths where there is little water movement in order to provide protection against violence of extreme weather conditions.

11. System for extracting energy from sea waves as claimed in claim 1 wherein the buoyancy body has a low weight with high buoyancy forces, wherein the buoyancy forces can be modified by controlled flooding of the buoyancy body.

12. System for extracting energy from sea waves as claimed in claim 1 wherein the energy converters and the control device for controlling at least one chosen from cable pull and cable length are disposed in a manner protected against sea water on a static structure above the sea level.

13. System for extracting energy from sea waves as claimed in claim 1 in combination with an offshore wind power installation, wherein the energy conversion devices protected against sea water, and the control device for controlling at least one chosen from cable pull and cable length is disposed on or in a tower of the wind power installation.

14. System for extracting energy from sea waves as claimed in claim 1 is adapted to be connected in a plurality of the systems to form modules of an energy farm which can be erected alone or in combination with a wind farm.

15. System for extracting energy from sea waves as claimed in claim 1 wherein the stationary reference points for the buoyancy body are adapted for being provided on an immersed structure.

16. System for extracting energy from sea waves as claimed in claim 1 wherein the cables fastened to the buoyancy body are routed to sea water/hydraulic pumps, from which out-going pressure lines are run to energy converters in which the hydraulic pressure is converted into electrical energy.

17. System for extracting energy from sea waves as claimed in claim 1, wherein the attachment device allows for adjustment of the buoyancy body at least in relation to wave direction by movement of the buoyancy body relative to the central attachment device and about a central axis of the buoyancy body.

18. Method for extracting energy from waves of sea water, comprising:
    immersing a buoyancy body in the sea water, wherein a longitudinal extension of said body is a multiple of a height and width of the body;
    running at least three cables from the buoyancy body in a splayed-out manner to mutually spaced stationary reference points that are provided beneath the buoyancy body, wherein at least one of the cables is provided as a guide cable for guiding the buoyancy body on a trajectory and at least one of the cables is provided as a working cable for transmitting the wave energy extracted by the buoyancy body to at least one energy converter;
    attaching the cables to a common central attachment device on the buoyancy body, wherein the attachment device allows for adjustment of the buoyancy body at least in relation to wave direction by movement of the buoyancy body relative to the attachment device;
    adjusting the guide cable on the side remote from the waves in length in dependence upon a desired radius and the inclination of the trajectory of the buoyancy body;
    stopping the working cable on the side of the buoyancy body closest to the waves when a wave crest is contacted until a desired immersion depth or desired pulling force is achieved;
    permitting movement of the buoyancy body at a defined force or speed whereby the buoyancy body transfers mechanical energy to an energy converter via the working cable on the side of the buoyancy body closest to the waves; and
    moving the buoyancy body back to a starting position after a wave crest is reached;
    wherein the buoyancy body rotates about a central axis of the buoyancy body that coincides with the common central attachment device, wherein the buoyancy body orients parallel to the wave crests.

19. Method for extracting energy as claimed in claim 18, wherein the movement of the buoyancy body into its starting position is actively supported by a cable pull force introduced via one or a plurality of working cables.

20. Method for extracting energy as claimed in claim 18, wherein the length of the guide cable is adapted prior to, or during, the movement of the buoyancy body in order to achieve an optimal movement path.

21. Method for extracting energy as claimed in claim 18, wherein the force introduced via the working cable is used to adjust the immersion depth of the buoyancy body into the wave trough.

22. Method for extracting energy as claimed in claim 18, wherein the attachment device allows for adjustment of the buoyancy body at least in relation to wave direction by movement of the buoyancy body relative to the central attachment device and about a central axis of the buoyancy body.

* * * * *